(12) United States Patent
Horiguchi et al.

(10) Patent No.: US 11,220,135 B2
(45) Date of Patent: Jan. 11, 2022

(54) PNEUMATIC TIRE

(71) Applicant: SUMITOMO RUBBER INDUSTRIES, LTD., Kobe (JP)

(72) Inventors: Takuya Horiguchi, Kobe (JP); Hiroki Nakajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/490,420

(22) PCT Filed: Mar. 1, 2018

(86) PCT No.: PCT/JP2018/007676
§ 371 (c)(1),
(2) Date: Aug. 30, 2019

(87) PCT Pub. No.: WO2018/180162
PCT Pub. Date: Oct. 4, 2018

(65) Prior Publication Data
US 2020/0009915 A1    Jan. 9, 2020

(30) Foreign Application Priority Data
Mar. 28, 2017   (JP) .............................. JP2017-062854

(51) Int. Cl.
*B60C 5/14*        (2006.01)
*B60C 1/00*        (2006.01)
(Continued)

(52) U.S. Cl.
CPC .............. *B60C 5/14* (2013.01); *B60C 1/0008* (2013.01); *B60C 1/0041* (2013.01); *C08L 23/22* (2013.01);
(Continued)

(58) Field of Classification Search
CPC ....... B60C 5/14; B60C 1/0008; B60C 1/0041; B60C 1/00; C08L 23/22; C08L 9/00;
(Continued)

(56) References Cited

U.S. PATENT DOCUMENTS

2008/0097021 A1* 4/2008 Krueger .................. C08L 21/00
524/451
2013/0137807 A1   5/2013 Miyazaki
(Continued)

FOREIGN PATENT DOCUMENTS

EP      3 196 244 A1    7/2017
JP      7-237405 A      9/1995
(Continued)

OTHER PUBLICATIONS

Machine translation of JP-2016-37086-A, published Mar. 22, 2016 (foreign and English language versions provided).
(Continued)

*Primary Examiner* — Jessica M Roswell
(74) *Attorney, Agent, or Firm* — Birch, Stewart, Kolasch & Birch, LLP

(57) ABSTRACT

Provide is a pneumatic tire that is excellent in air retention properties and adhesion at the interface between the innerliner and the insulation, particularly in the joint portion. Included is a pneumatic tire including: a carcass; an insulation adjacent to the radially inner side of the carcass; and an innerliner adjacent to the radially inner side of the insulation, the innerliner including an innerliner rubber composition, the innerliner rubber composition containing a polymer component including, based on 100% by mass thereof, 80 to 100% by mass of a butyl-based rubber and containing, per 100 parts by mass of the polymer component, 40 to 70 parts by mass of carbon black, 0.5 to 5.0 parts by mass of zinc oxide, and 0.2 to 5.0 parts by mass of sulfur,
(Continued)

the insulation including an insulation rubber composition, the insulation rubber composition containing a polymer component including, based on 100% by mass thereof, 20 to 90% by mass of a butyl-based rubber and 10 to 80% by mass of an isoprene-based rubber and containing, per 100 parts by mass of the polymer component, 40 to 80 parts by mass of carbon black and 0.2 to 5.0 parts by mass of sulfur, the innerliner and insulation rubber compositions having butyl-based rubber contents based on 100% by mass of the polymer component that satisfy the following relationship:
(Butyl-based rubber content of innerliner rubber composition)≥(Butyl-based rubber content of insulation rubber composition).

12 Claims, 1 Drawing Sheet

(51) Int. Cl.
*C08L 23/22* (2006.01)
*C08K 3/04* (2006.01)
*C08K 3/06* (2006.01)
C08K 3/22 (2006.01)

(52) U.S. Cl.
CPC .................. *C08K 3/04* (2013.01); *C08K 3/06* (2013.01); *C08K 2003/2296* (2013.01)

(58) Field of Classification Search
CPC .... C08K 3/04; C08K 3/06; C08K 2003/2296; C08K 3/22
See application file for complete search history.

(56) References Cited

U.S. PATENT DOCUMENTS

| | | |
|---|---|---|
| 2014/0190619 A1 | 7/2014 | Imoto et al. |
| 2014/0196822 A1 | 7/2014 | Hirayama |
| 2015/0239293 A1 | 8/2015 | Nakazono et al. |

FOREIGN PATENT DOCUMENTS

| | | |
|---|---|---|
| JP | 2013-28784 A | 2/2013 |
| JP | 2013-86295 A | 5/2013 |
| JP | 2014-227494 A | 12/2014 |
| JP | 2016-37086 A | 3/2016 |
| JP | 2016-50274 A | 4/2016 |
| JP | 2016-108366 A | 6/2016 |
| WO | WO 2013/054865 A1 | 4/2013 |
| WO | WO 2014/041842 A1 | 3/2014 |

OTHER PUBLICATIONS

Machine translation of JP-2016-50274-A, published Apr. 11, 2016 (foreign and English language versions provided).
Machine translation of JP-7-237405-A, published Sep. 12, 1995 (foreign and English language versions provided).
International Search Report issued in PCT/JP2018/007676 (PCT/ISA/210), dated Jun. 5, 2018.
Written Opinon of the International Searching Authority issued in PCT/JP2018/007676 (PCT/ISA/237), dated Jun. 5, 2018.

* cited by examiner

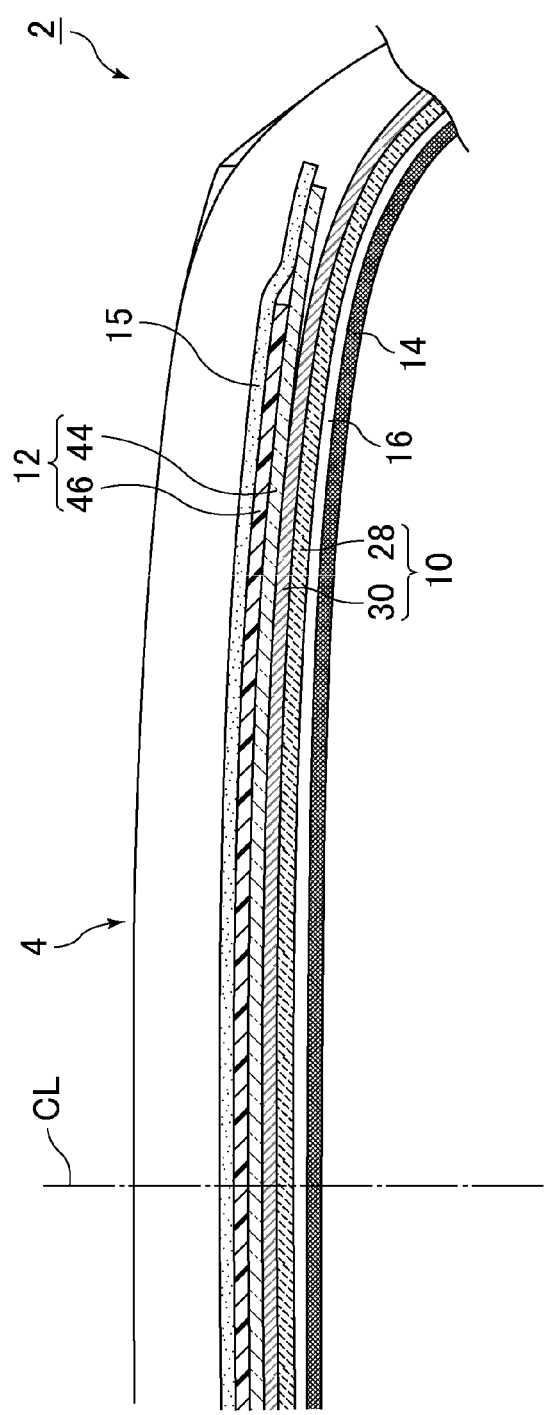

PNEUMATIC TIRE

TECHNICAL FIELD

The present invention relates to a pneumatic tire.

BACKGROUND ART

Pneumatic tires are made up of various components including innerliners as well as treads that come in contact with the road. Innerliners are tire components that provide air retention properties by reducing air leakage (air permeation) from inside to outside of the tire. These components contain butyl-based rubbers having low air permeability, e.g., butyl rubber, to provide air retention properties (for example, Patent Literature 1).

CITATION LIST

Patent Literature

Patent Literature 1: JP 2014-227494 A

SUMMARY OF INVENTION

Technical Problem

As a result of experimentation, the present inventors have discovered that an innerliner rubber composition with a higher butyl-based rubber content shows improved air retention properties but has poor vulcanized adhesion to different rubber compounds, so that peeling (separation) may occur at the interface between the innerliner and the insulation adjacent to the innerliner during running of the tire. It has also been found that such peeling is likely to occur particularly in the joint portion formed during the tire building process.

One possible solution to this problem is attaching a butyl tape to the joint portion. However, this method is insufficient in that, for example, peeling may occur in portions other than the joint portion.

The present invention aims to solve the problem and provide a pneumatic tire that is excellent in air retention properties and adhesion at the interface between the innerliner and the insulation, particularly in the joint portion.

Solution to Problem

The present invention relates to a pneumatic tire, including: a carcass; an insulation adjacent to a radially inner side of the carcass; and an innerliner adjacent to a radially inner side of the insulation, the innerliner including an innerliner rubber composition, the innerliner rubber composition containing a polymer component including, based on 100% by mass thereof, 80 to 100% by mass of a butyl-based rubber and containing, per 100 parts by mass of the polymer component, 40 to 70 parts by mass of carbon black, 0.5 to 5.0 parts by mass of zinc oxide, and 0.2 to 5.0 parts by mass of sulfur, the insulation including an insulation rubber composition, the insulation rubber composition containing a polymer component including, based on 100% by mass thereof, 20 to 90% by mass of a butyl-based rubber and 10 to 80% by mass of an isoprene-based rubber and containing, per 100 parts by mass of the polymer component, 40 to 80 parts by mass of carbon black and 0.2 to 5.0 parts by mass of sulfur, the innerliner and insulation rubber compositions having butyl-based rubber contents based on 100% by mass of the polymer component that satisfy the following relationship: (Butyl-based rubber content of innerliner rubber composition)≥(Butyl-based rubber content of insulation rubber composition).

In the pneumatic tire, the butyl-based rubber contents based on 100% by mass of the polymer component of the innerliner and insulation rubber compositions satisfy the following relationship:
0≤(Butyl-based rubber content of innerliner rubber composition)−(Butyl-based rubber content of insulation rubber composition)≤50.

Advantageous Effects of Invention

The pneumatic tire of the present invention includes a carcass, an insulation adjacent to the radially inner side of the carcass, and an innerliner adjacent to the radially inner side of the insulation. The innerliner includes an innerliner rubber composition which contains predetermined amounts of a butyl-based rubber, carbon black, zinc oxide, and sulfur. The insulation includes an insulation rubber composition which contains predetermined amounts of a butyl-based rubber, an isoprene-based rubber, carbon black, and sulfur. The innerliner and insulation rubber compositions have butyl-based rubber contents based on 100% by mass of the polymer component that satisfy a predetermined relationship. Such a pneumatic tire is excellent in air retention properties and adhesion at the interface between the innerliner and the insulation, particularly in the joint portion.

BRIEF DESCRIPTION OF DRAWINGS

FIG. 1 shows a partial cross-sectional view of one embodiment of a pneumatic tire.

DESCRIPTION OF EMBODIMENTS

The pneumatic tire of the present invention includes a carcass, an insulation adjacent to the radially inner side of the carcass, and an innerliner adjacent to the radially inner side of the insulation, the innerliner including an innerliner rubber composition, the innerliner rubber composition containing a polymer component including, based on 100% by mass thereof, 80 to 100% by mass of a butyl-based rubber and containing, per 100 parts by mass of the polymer component, 40 to 70 parts by mass of carbon black, 0.5 to 5.0 parts by mass of zinc oxide, and 0.2 to 5.0 parts by mass of sulfur, the insulation including an insulation rubber composition, the insulation rubber composition containing a polymer component including, based on 100% by mass thereof, 20 to 90% by mass of a butyl-based rubber and 10 to 80% by mass of an isoprene-based rubber and containing, per 100 parts by mass of the polymer component, 40 to 80 parts by mass of carbon black and 0.2 to 5.0 parts by mass of sulfur, the innerliner and insulation rubber compositions having butyl-based rubber contents based on 100% by mass of the polymer component that satisfy the following relationship: (Butyl-based rubber content of innerliner rubber composition)≥(Butyl-based rubber content of insulation rubber composition).

The present invention provides both air retention properties and adhesion at the interface between the innerliner and the insulation, particularly in the joint portion (hereinafter, also referred to simply as adhesion). The mechanism of this effect can be explained as follows.

The present invention combines an innerliner having a high butyl-based rubber content with an insulation containing predetermined amounts of butyl-based and isoprene-based rubbers to improve adhesion between both components. Thus, the adhesion at the interface between the innerliner and the insulation, particularly in the joint portion, is improved so that peeling at the joint interface can be reduced.

As described, in the present invention, even though an innerliner having a high butyl-based rubber content is used, adhesion between both components is improved by combining it with the specific insulation. This permits the use of an innerliner having a high butyl-based rubber content with excellent air retention properties.

Further, in addition to the good air retention properties resulting from the high butyl-based rubber content of the innerliner, the present invention provides better air retention properties because the insulation also contains a predetermined amount of a butyl-based rubber.

This effect is more suitably achieved when the butyl-based rubber contents based on 100% by mass of the polymer component of the innerliner and insulation rubber compositions satisfy a predetermined relationship.

Thus, the present invention provides synergistically improved air retention properties and adhesion (particularly, synergistically improved adhesion) due to the synergistic effect of the specific innerliner and the specific insulation.

The pneumatic tire of the present invention includes a carcass, an insulation adjacent to the radially inner side of the carcass, and an innerliner adjacent to the radially inner side of the insulation.

The term "carcass" refers to a component including tire cords and a tire cord topping rubber layer. Specifically, it is a component as shown in FIG. 1 of JP 2008-75066 A which is hereby incorporated by reference in its entirety, etc.

The term "insulation" refers to a component disposed between an innerliner and a carcass. Specifically, it is a component as shown in FIGS. 1 and 2 of JP 2008-150523 A, FIG. 1 of JP 2007-269876 A, etc.

The term "innerliner" refers to a component configured to form an inner cavity surface of a tire. This component reduces air permeation to maintain the internal pressure of the tire. Specifically, it is a component as shown in FIG. 1 of JP 2008-291091 A, FIGS. 1 and 2 of JP 2007-160980 A, etc.

FIG. 1 shows a partial cross-sectional view of one embodiment of a pneumatic tire.

In FIG. 1, the vertical direction corresponds to the radial direction of the tire, the horizontal direction corresponds to the axis direction thereof, and the direction perpendicular to the drawing plane corresponds to the circumferential direction thereof. The dash-dotted line CL represents the equatorial plane of the pneumatic tire 2. A tread portion 4 of the pneumatic tire 2 includes an innerliner 14, an insulation 16, a carcass 10 (a first ply 28 and a second ply 30), a breaker 12 (an inner layer 44 and an outer layer 46), and a band 15 in the stated order from the radially inner side of the tire. In one embodiment, the insulation rubber composition is used in the insulation 16 adjacent to the radially (with respect to the tire) inner side of the carcass 10, and the innerliner rubber composition is used in the innerliner 14 adjacent to the radially (with respect to the tire) inner side of the insulation 16.

The innerliner and insulation in the present invention include an innerliner rubber composition and insulation rubber composition, respectively, each containing a butyl-based rubber as a polymer component.

The term "polymer component" herein refers to an elastomer component serving as a base material of a rubber composition. Specifically, it may refer to a diene-based rubber used as a rubber component in the tire industry or a thermoplastic elastomer used as a base material of an innerliner (rubber) composition.

Examples of the butyl-based rubber include halogenated butyl rubbers (X-IIR) such as brominated butyl rubber (BR-IIR) and chlorinated butyl rubber (Cl-IIR), and butyl rubber (IIR). These may be used alone, or two or more of these may be used in combination. In order to obtain a more suitable effect, X-IIR such as Cl-IIR is preferred, with Cl-IIR being more preferred.

The butyl-based rubber may be a commercial product available from, for example, Exxon Mobil Corporation, JSR Corporation, or Japan Butyl Co., Ltd.

In the present invention, the butyl-based rubber contents based on 100% by mass of the polymer component of the innerliner and insulation rubber compositions satisfy the relationship below. In this case, the effect of the present invention can be sufficiently achieved.

(Butyl-based rubber content of innerliner rubber composition)≥(Butyl-based rubber content of insulation rubber composition)

The above relationship can be modified to the form below. A more suitable effect can be obtained by satisfying the following relationship.

0≤(Butyl-based rubber content of innerliner rubber composition)−(Butyl-based rubber content of insulation rubber composition)≤50

The upper limit of the relationship is preferably 30. The lower limit of the relationship is preferably 0.1, more preferably 1.

In the relationship, the term "Butyl-based rubber content of innerliner rubber composition" refers to the amount of the butyl-based rubber based on 100% by mass of the polymer component in the innerliner rubber composition, and the term "Butyl-based rubber content of insulation rubber composition" refers to the amount of the butyl-based rubber based on 100% by mass of the polymer component in the insulation rubber composition.

The innerliner and insulation rubber compositions to be used are described below.

(Innerliner Rubber Composition)

The innerliner rubber composition contains a polymer component including, based on 100% by mass thereof, 80 to 100% by mass of a butyl-based rubber. The lower limit of the amount of the butyl-based rubber is preferably 90% by mass. This provides better air retention properties and adhesion.

Moreover, the upper limit may be 95% by mass.

Examples of materials other than the butyl-based rubber that may be used in the polymer component of the innerliner rubber composition include, but not limited to, diene-based rubbers, including isoprene-based rubbers such as natural rubber (NR) and polyisoprene rubber (IR), polybutadiene rubber (BR), styrene butadiene rubber (SBR), chloroprene rubber (CR), and acrylonitrile butadiene rubber (NBR); and thermoplastic elastomers such as styrene-isobutylene-styrene block copolymers (SIBS), styrene-isoprene-styrene block copolymers (SIS), styrene-isobutylene block copolymers (SIB), styrene-butadiene-styrene block copolymers (SBS), styrene-isobutylene-styrene block copolymers (SIBS), styrene-ethylene/butene-styrene block copolymers (SEBS), styrene-ethylene/propylene-styrene block copolymers (SEPS), styrene-ethylene/ethylene/propylene-styrene block copolymers (SEEPS), and styrene-butadiene/butylene-styrene block copolymers (SBBS). These may be used alone, or two or more of these may be used in combination. Among these, isoprene-based rubbers are preferred in order to obtain a more suitable effect.

Herein, examples of the isoprene-based rubbers include natural rubber (NR), polyisoprene rubber (IR), refined NR, modified NR, and modified IR. The NR may be one commonly used in the tire industry such as SIR20, RSS #3, or TSR20. Any IR may be used, and examples include those commonly used in the tire industry, such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These rubbers may be used alone, or two or more of these may be used in combination. NR is preferred among these.

The amount of the isoprene-based rubbers, if present, based on 100% by mass of the polymer component is preferably 5 to 20% by mass, more preferably 5 to 10% by mass.

The combined amount of the butyl-based rubber and isoprene-based rubbers based on 100% by mass of the polymer component is preferably 80% by mass or more, more preferably 90% by mass or more, still more preferably 100% by mass.

The innerliner rubber composition contains carbon black. This provides good air retention properties and adhesion.

Any carbon black may be used, and examples include N134, N110, N220, N234, N219, N339, N330, N326, N351, N550, and N762. These may be used alone, or two or more of these may be used in combination.

The carbon black preferably has a nitrogen adsorption specific surface area ($N_2SA$) of 5 $m^2/g$ or more, more preferably 10 $m^2/g$ or more, still more preferably 15 $m^2/g$ or more. When the $N_2SA$ is not less than the lower limit, good air retention properties and adhesion tend to be obtained. The $N_2SA$ is also preferably 300 $m^2/g$ or less, more preferably 150 $m^2/g$ or less, still more preferably 40 $m^2/g$ or less. When the $N_2SA$ is not more than the upper limit, good air retention properties and adhesion tend to be obtained.

The nitrogen adsorption specific surface area of the carbon black can be determined in accordance with JIS K6217-2:2001.

The carbon black preferably has a dibutyl phthalate oil absorption (DBP) of 5 mL/100 g or more, more preferably 40 mL/100 g or more, still more preferably 70 mL/100 g or more. When the DBP is not less than the lower limit, good air retention properties and adhesion tend to be obtained. The DBP is also preferably 300 mL/100 g or less, more preferably 200 mL/100 g or less, still more preferably 120 mL/100 g or less. When the DBP is not more than the upper limit, good air retention properties and adhesion tend to be obtained.

The DBP of the carbon black can be measured by a method in accordance with JIS K6217-4:2001.

The carbon black may be a commercial product available from, for example, Asahi Carbon Co., Ltd., Cabot Japan K.K., Tokai Carbon Co., Ltd., Mitsubishi Chemical Corporation, Lion Corporation, NSCC Carbon Co., Ltd., or Columbia Carbon.

The amount of the carbon black per 100 parts by mass of the polymer component is 40 parts by mass or more, preferably 50 parts by mass or more. Also, the amount is 70 parts by mass or less, preferably 65 parts by mass or less. When the amount of the carbon black is adjusted as indicated above, good air retention properties and adhesion can be obtained. Further, the formation of cracks during running can be reduced, and good fuel economy can also be obtained.

The innerliner rubber composition contains zinc oxide. This provides good air retention properties and adhesion.

Conventional zinc oxide may be used, and examples include commercial products available from Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the polymer component is 0.5 parts by mass or more, preferably 1.0 part by mass or more. Also, the amount is 5.0 parts by mass or less, preferably 4.0 parts by mass or less, more preferably 2.5 parts by mass or less. When the amount of the zinc oxide is adjusted as indicated above, good air retention properties and adhesion can be obtained. Further, the formation of cracks during running can also be reduced.

The innerliner rubber composition contains sulfur. This provides good air retention properties and adhesion.

Examples of the sulfur include those commonly used in the rubber industry, such as powdered sulfur, precipitated sulfur, colloidal sulfur, insoluble sulfur, highly dispersible sulfur, and soluble sulfur. These may be used alone, or two or more of these may be used in combination.

The sulfur may be a commercial product available from, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The amount of the sulfur per 100 parts by mass of the polymer component is 0.2 parts by mass or more, preferably 0.4 parts by mass or more. Also, the amount is 5.0 parts by mass or less, preferably 3.0 parts by mass or less, more preferably 1.5 parts by mass or less. When the amount of the sulfur is adjusted as indicated above, good air retention properties and adhesion can be obtained.

(Insulation Rubber Composition)

The insulation rubber composition contains a polymer component including, based on 100% by mass thereof, 20 to 90% by mass of a butyl-based rubber. The lower limit of the amount of the butyl-based rubber is preferably 40% by mass, more preferably 60% by mass, still more preferably 70% by mass. This provides better air retention properties and adhesion.

The polymer component includes, based on 100% by mass thereof, 10 to 80% by mass of an isoprene-based rubber. The upper limit of the amount of the isoprene-based rubber is preferably 60% by mass, more preferably 40% by mass, still more preferably 30% by mass. This provides better air retention properties and adhesion.

As the isoprene-based rubber, embodiments of isoprene-based rubbers as described above may be suitably used.

The combined amount of the butyl-based and isoprene-based rubbers based on 100% by mass of the polymer component is preferably 80% by mass or more, more preferably 90% by mass or more, still more preferably 100% by mass.

Materials other than the butyl-based and isoprene-based rubbers that may be used in the polymer component of the insulation rubber composition are not particularly limited, and embodiments of such materials as described for the innerliner rubber composition may be suitably used.

The insulation rubber composition contains carbon black. This provides good air retention properties and adhesion.

Moreover, both the innerliner and insulation rubber compositions in the present invention contain carbon black. Thus, the adhesion interface is suitably reinforced to provide better adhesion.

Any carbon black may be used, and embodiments of carbon black as described for the innerliner rubber composition may be suitably used.

The amount of the carbon black per 100 parts by mass of the polymer component is 40 parts by mass or more, preferably 50 parts by mass or more. Also, the amount is 80 parts by mass or less, preferably 70 parts by mass or less. When the amount of the carbon black is adjusted as indicated above, good air retention properties and adhesion can be obtained. Further, the formation of cracks during running can be reduced, and good fuel economy can also be obtained.

The insulation rubber composition contains sulfur. This provides good air retention properties and adhesion.

Any sulfur may be used, and embodiments of sulfur as described for the innerliner rubber composition may be suitably used.

The amount of the sulfur per 100 parts by mass of the polymer component is 0.2 parts by mass or more, preferably 0.4 parts by mass or more. Also, the amount is 5.0 parts by mass or less, preferably 3.0 parts by mass or less, more preferably 1.5 parts by mass or less. When the amount of the sulfur is adjusted as indicated above, good air retention properties and adhesion can be obtained.

The insulation rubber composition preferably contains zinc oxide. This tends to provide good air retention properties and adhesion.

Any zinc oxide may be used, and embodiments of zinc oxide as described for the innerliner rubber composition may be suitably used.

The amount of the zinc oxide, if present, per 100 parts by mass of the polymer component is preferably 0.5 parts by mass or more, more preferably 1.0 part by mass or more. The amount is also preferably 5.0 parts by mass or less, more preferably 4.0 parts by mass or less, still more preferably 2.5 parts by mass or less. When the amount of the zinc oxide is adjusted as indicated above, good air retention properties and adhesion can be obtained. Further, the formation of cracks during running can be reduced.

(Innerliner Rubber Composition, Insulation Rubber Composition)

The innerliner and insulation rubber compositions each preferably contain a vulcanization accelerator. This tends to provide good air retention properties and adhesion.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as
N-cyclohexyl-2-benzothiazole sulfenamide,
N-t-butyl-2-benzothiazolyl sulfenamide,
N-oxyethylene-2-benzothiazole sulfenamide,
N-oxyethylene-2-benzothiazole sulfonamide, and
N,N'-diisopropyl-2-benzothiazole sulfenamide; and guanidine vulcanization accelerators such as diphenylguanidine, diorthotolylguanidine, and orthotolylbiguanidine. These may be used alone, or two or more of these may be used in combination. To obtain a more suitable effect, thiazole vulcanization accelerators are preferred among these, with di-2-benzothiazolyl disulfide being more preferred.

The amount of the vulcanization accelerator, if present, per 100 parts by mass of the polymer component in the innerliner or insulation rubber composition is preferably 0.2 parts by mass or more, more preferably 0.5 parts by mass or more. The amount is also preferably 10 parts by mass or less, more preferably 3.0 parts by mass or less, still more preferably 2.0 parts by mass or less. When the amount is within the range indicated above, a good effect tends to be obtained.

The innerliner and insulation rubber compositions each preferably contain stearic acid. This tends to provide good air retention properties and adhesion.

Conventional stearic acid may be used, and examples include commercial products available from NOF Corporation, Kao Corporation, Wako Pure Chemical Industries, Ltd., and Chiba Fatty Acid Co., Ltd.

The amount of the stearic acid, if present, per 100 parts by mass of the polymer component in the innerliner or insulation rubber composition is preferably 0.5 parts by mass or more, more preferably 1.0 part by mass or more. The amount is also preferably 10 parts by mass or less, more preferably 3.0 parts by mass or less, still more preferably 2.0 parts by mass or less. When the amount is within the range indicated above, a good effect tends to be obtained.

The innerliner and insulation rubber compositions may each contain an antioxidant.

Examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)-propionate]methane. These may be used alone, or two or more of these may be used in combination. Among these, p-phenylenediamine or quinoline antioxidants are preferred, with N-(1,3-dimethylbutyl)-N'-phenyl-p-phenylenediamine or 2,2,4-trimethyl-1,2-dihydroquinoline polymer being more preferred.

The antioxidant may be a commercial product available from, for example, Seiko Chemical Co., Ltd., Sumitomo Chemical Co., Ltd., Ouchi Shinko Chemical Industrial Co., Ltd., or Flexsys.

The amount of the antioxidant, if present, per 100 parts by mass of the polymer component in the innerliner or insulation rubber composition is preferably 0.3 parts by mass or more, more preferably 0.5 parts by mass or more. The amount is also preferably 10 parts by mass or less, more preferably 3.0 parts by mass or less, still more preferably 2.0 parts by mass or less.

The innerliner and insulation rubber compositions may each contain silica.

Examples of the silica include dry silica (anhydrous silica) and wet silica (hydrous silica). Wet silica is preferred because it contains a large number of silanol groups. These may be used alone, or two or more of these may be used in combination.

The silica preferably has a nitrogen adsorption specific surface area ($N_2SA$) of 90 $m^2/g$ or more, more preferably 120 $m^2/g$ or more, still more preferably 150 $m^2/g$ or more.

The $N_2SA$ is preferably 400 m²/g or less, more preferably 200 m²/g or less, still more preferably 180 m²/g or less.

The nitrogen adsorption specific surface area of the silica is measured by the BET method in accordance with ASTM D3037-81.

The silica may be a commercial product available from, for example, Degussa, Rhodia, Tosoh Silica Corporation, Solvay Japan, or Tokuyama Corporation.

The amount of the silica, if present, per 100 parts by mass of the polymer component in the innerliner or insulation rubber composition is preferably 5 parts by mass or more, more preferably 30 parts by mass or more. The amount is also preferably 200 parts by mass or less, more preferably 100 parts by mass or less.

To obtain a better effect, the combined amount of the carbon black and silica per 100 parts by mass of the polymer component in the innerliner or insulation rubber composition is preferably 20 to 250 parts by mass, preferably 40 to 120 parts by mass, still more preferably 50 to 80 parts by mass.

The innerliner and insulation rubber compositions may each contain a silane coupling agent.

Any silane coupling agent may be used, and examples include: sulfide silane coupling agents such as
bis(3-triethoxysilylpropyl)tetrasulfide,
bis(2-triethoxysilylethyl)tetrasulfide,
bis(4-triethoxysilylbutyl)tetrasulfide,
bis(3-trimethoxysilylpropyl)tetrasulfide,
bis(2-trimethoxysilylethyl)tetrasulfide,
bis(2-triethoxysilylethyl)trisulfide,
bis(4-trimethoxysilylbutyl)trisulfide,
bis(3-triethoxysilylpropyl)disulfide,
bis(2-triethoxysilylethyl)disulfide,
bis(4-triethoxysilylbutyl)disulfide,
bis(3-trimethoxysilylpropyl)disulfide,
bis(2-trimethoxysilylethyl)disulfide,
bis(4-trimethoxysilylbutyl)disulfide,
3-trimethoxysilylpropyl-N,N-dimethylthiocarbamoyl tetrasulfide,
2-triethoxysilylethyl-N,N-dimethylthiocarbamoyl tetrasulfide, and 3-triethoxysilylpropyl methacrylate monosulfide; mercapto silane coupling agents such as
3-mercaptopropyltrimethoxysilane,
2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone, or two or more of these may be used in combination.

The silane coupling agent may be a commercial product available from, for example, Degussa, Momentive, Shin-Etsu Silicone, Tokyo Chemical Industry Co., Ltd., AZmax. Co., or Dow Corning Toray Co., Ltd.

The amount of the silane coupling agent, if present, per 100 parts by mass of the silica in the innerliner or insulation rubber composition is preferably 3 parts by mass or more, more preferably 5 parts by mass or more. An amount of 3 parts by mass or more tends to allow the added silane coupling agent to produce its effect. The amount is also preferably 20 parts by mass or less, more preferably 10 parts by mass or less. An amount of 20 parts by mass or less tends to lead to an effect commensurate with the added amount and good processability during kneading.

The innerliner and insulation rubber compositions may each contain a resin. The term "resin" as used here excludes resins corresponding to the polymer component.

Any resin commonly used in the tire industry may be used. Examples include coumarone-indene resins, terpene resins, p-t-butylphenol acetylene resins, and acrylic resins. These may be used alone, or two or more of these may be used in combination.

The resin may be a commercial product available from, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., or Taoka Chemical Co., Ltd.

The amount of the resin, if present, per 100 parts by mass of the polymer component in the innerliner or insulation rubber composition is preferably 1 part by mass or more, more preferably 3 parts by mass or more. The amount is also preferably 50 parts by mass or less, more preferably 30 parts by mass or less, still more preferably 15 parts by mass or less.

The innerliner and insulation rubber compositions may each contain an oil.

Examples of the oil include process oils and plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone, or two or more of these may be used in combination.

The oil may be a commercial product available from, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil, if present, per 100 parts by mass of the polymer component in the innerliner or insulation rubber composition is preferably 1 part by mass or more, more preferably 10 parts by mass or more, still more preferably 30 parts by mass or more. The amount is also preferably 80 parts by mass or less, more preferably 60 parts by mass or less. The amount of the oil here includes the amount of the oil contained in rubber (oil-extended rubber).

The innerliner and insulation rubber compositions may each contain a liquid diene polymer as a softener.

The term "liquid diene polymer" refers to a diene polymer that is liquid at room temperature (25° C.). The liquid diene polymer preferably has a polystyrene equivalent weight average molecular weight (Mw) of $1.0 \times 10^3$ to $2.0 \times 10^5$, more preferably $3.0 \times 10^3$ to $1.5 \times 10^4$, as measured by gel permeation chromatography (GPC).

Examples of the liquid diene polymer include liquid styrene-butadiene copolymers (liquid SBR), liquid polybutadiene polymers (liquid BR), liquid polyisoprene polymers (liquid IR), and liquid styrene-isoprene copolymers (liquid SIR). These may be used alone, or two or more of these may be used in combination.

The amount of the liquid diene polymer, if present, per 100 parts by mass of the polymer component in the innerliner or insulation rubber composition may be 50 parts by mass or less, for example.

The innerliner and insulation rubber compositions may each contain a wax.

Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone, or two or more of these may be used in combination.

The wax may be a commercial product available from, for example, Ouchi Shinko Chemical Industrial Co., Ltd., Nippon Seiro Co., Ltd., or Seiko Chemical Co., Ltd.

The amount of the wax, if present, per 100 parts by mass of the polymer component in the innerliner or insulation rubber composition is preferably 0.5 parts by mass or more, more preferably 1 part by mass or more. The amount is also preferably 10 parts by mass or less, more preferably 7 parts by mass or less.

The rubber compositions may contain additives commonly used in the tire industry, in addition to the above-mentioned components. Examples of such additives include fillers such as calcium carbonate, talc, alumina, clay, aluminum hydroxide, aluminum oxide, and mica; processing aids such as plasticizers and lubricants; softeners other than oils and liquid diene polymers; and vulcanizing agents other than sulfur (e.g., organic crosslinking agents, organic peroxides).

Moreover, the innerliner and insulation rubber compositions (particularly the innerliner rubber composition) may each contain a plate-like inorganic filler. This provides better air retention properties.

Examples of the plate-like inorganic filler include clay, talc, bentonite, and montmorillonite. These may be used alone, or two or more of these may be used in combination.

The amount of the plate-like inorganic filler, if present, per 100 parts by mass of the polymer component in the innerliner or insulation rubber composition is preferably 5 to 85 parts by mass, more preferably 10 to 70 parts by mass.

(Pneumatic Tire)

The pneumatic tire of the present invention may be produced by conventional methods, such as described below.

First, the components other than vulcanizing agents and vulcanization accelerators may be compounded (added) and kneaded in a rubber kneading machine such as a Banbury mixer or open roll mill to give a kneaded mixture (base kneading step). Then, the vulcanizing agents and vulcanization accelerators may be compounded (added) and kneaded with the kneaded mixture. In this manner, unvulcanized innerliner and insulation rubber compositions can be prepared.

As to the kneading conditions used when additives other than vulcanizing agents and vulcanization accelerators are compounded, the kneading temperature is usually 50 to 200° C., preferably 80 to 190° C., and the kneading time is usually 30 seconds to 30 minutes, preferably 1 minute to 30 minutes.

When vulcanizing agents and/or vulcanization accelerators are compounded, the kneading temperature is usually 100° C. or lower, preferably from room temperature to 80° C.

Next, the unvulcanized rubber compositions may be extruded into innerliner and insulation shapes, respectively, and then assembled with other tire components on a tire building machine to produce an unvulcanized tire (=a raw cover), which may then be heated and pressed in a vulcanizer to produce a pneumatic tire.

The unvulcanized tire may also be produced by preparing a sheet consisting of an innerliner and an insulation by a known method, such as laminating the sheeted rubber compositions into a predetermined shape, or charging the rubber compositions into two or more extruders to form a two-layered product at the head outlet of the extruders, followed by assembling the sheet with other tire components on a tire building machine.

The innerliner of the pneumatic tire preferably has a thickness (thickness before vulcanization) of 0.1 mm or more, more preferably 0.3 mm or more, but preferably 5.0 mm or less, more preferably 2.0 mm or less. When the innerliner has a thickness within the range indicated above, a more suitable effect can be obtained.

The thickness of the innerliner refers to the thickness (length in the tire radial direction) of the innerliner in the equatorial plane.

The insulation of the pneumatic tire preferably has a thickness (thickness before vulcanization) of 0.1 mm or more, more preferably 0.3 mm or more, but preferably 5.0 mm or less, more preferably 2.0 mm or less. When the insulation has a thickness within the range indicated above, a more suitable effect can be obtained.

The thickness of the insulation refers to the thickness (length in the tire radial direction) of the insulation in the equatorial plane.

The pneumatic tire is suitable for use as a tire for passenger vehicles, large passenger vehicles, large SUVs, heavy load vehicles such as trucks and buses, light trucks, or two-wheeled vehicles.

EXAMPLES

The present invention is specifically described with reference to examples, but the present invention is not limited to the examples.

The chemicals used in the examples and comparative examples are listed below.

Natural rubber: natural rubber
Butyl-based rubber: Cl-IIR
Carbon black: carbon black ($N_2SA$: 27 $m^2$/g, DBP oil absorption: 87 mL/100 g)
Antioxidant: N-(1,3-dimethylbutyl)-N'-phenyl-p-phenylenediamine
Zinc oxide: zinc oxide #1 available from Mitsui Mining & Smelting Co., Ltd.
Stearic acid: stearic acid "TSUBAKI" available from NOF Corporation
Sulfur: powdered sulfur available from Tsurumi Chemical industry Co., Ltd.
Vulcanization accelerator: di-2-benzothiazolyl disulfide Examples and Comparative Examples (Innerliner Rubber Composition, Insulation Rubber Composition)

The materials other than the sulfur and vulcanization accelerator in the amounts shown in Table 1 or 2 were kneaded using a Banbury mixer (Kobe Steel, Ltd.) at 150° C. for five minutes to give a kneaded mixture. Then, the sulfur and vulcanization accelerator were added to the kneaded mixture, and they were kneaded using an open roll mill at 80° C. for five minutes to give an unvulcanized rubber composition.

(Pneumatic Tire)

Moreover, the unvulcanized innerliner and insulation rubber compositions prepared as above were extruded into the respective component shapes as indicated in Table 3 and then assembled with other tire components on a tire building machine to build an unvulcanized tire, which was then press-vulcanized at 170° C. for 10 minutes to prepare a test tire (size: 195/65R15). The thicknesses shown in Table 3 refer to the thicknesses in the unvulcanized tire.

The test tires prepared as above were evaluated as described below. Table 3 shows the evaluation results.

(Adhesion in Joint Portion)

The test tires, without being mounted on a rim, were placed in a moist-heat oven at 80° C. and a relative humidity of 95% for four weeks to degrade them. The degraded test tires were run on a drum under over-load conditions corresponding to 140% of the maximum load (maximum air pressure conditions) specified in the JIS standard, and then evaluated for adhesion in the joint portion (peeling at the interface between the innerliner and the insulation). The results are expressed as an index relative to Comparative Example 1 (=100). A higher index indicates better adhesion at the interface between the innerliner and the insulation, particularly in the joint portion. An index of 130 or higher is considered good.

(Air Retention Properties)

The test tires mounted on a JIS standard rim of 15×6JJ were inflated to an initial air pressure of 200 Kpa and left for 90 days at room temperature. Then, the rate (%/month) of decrease in air pressure was calculated. The results are expressed as an index relative to Comparative Example 1 (=100). A higher index indicates better air retention properties. An index of 130 or higher is considered good.

TABLE 1

| | | Innerliner rubber composition | | | | | |
|---|---|---|---|---|---|---|---|
| | | Comparative composition | Example composition | | | | |
| | | A1 | A2 | A3 | A4 | A5 | A6 |
| Amount (parts by mass) | Natural rubber | 30 | 10 | — | 20 | — | — |
| | Butyl-based rubber | 70 | 90 | 100 | 80 | 100 | 100 |
| | Carbon black | 60 | 60 | 60 | 60 | 40 | 60 |
| | Antioxidant | 1.0 | 1.0 | 1.0 | 1.0 | 1.0 | 1.0 |
| | Zinc oxide | 1.5 | 1.5 | 1.5 | 1.5 | 1.5 | 5.0 |
| | Stearic acid | 1.5 | 1.5 | 1.5 | 1.5 | 1.5 | 1.5 |
| | Sulfur | 0.6 | 0.6 | 0.6 | 0.6 | 0.6 | 5.0 |
| | Vulcanization accelerator | 1.0 | 1.0 | 1.0 | 1.0 | 1.0 | 1.0 |

TABLE 2

| | | Insulation rubber composition | | | | | | |
|---|---|---|---|---|---|---|---|---|
| | | Comparative composition | Example composition | | | | | |
| | | B1 | B2 | B3 | B4 | B5 | B6 | B7 |
| Amount (parts by mass) | Natural rubber | 100 | 50 | 20 | 80 | 20 | 20 | 20 |
| | Butyl-based rubber | — | 50 | 80 | 20 | 80 | 80 | 80 |
| | Carbon black | 60 | 60 | 60 | 60 | 40 | 80 | 60 |
| | Antioxidant | 1.0 | 1.0 | 1.0 | 1.0 | 1.0 | 1.0 | 1.0 |
| | Zinc oxide | 1.5 | 1.5 | 1.5 | 1.5 | 1.5 | 1.5 | 5.0 |
| | Stearic acid | 1.5 | 1.5 | 1.5 | 1.5 | 1.5 | 1.5 | 1.5 |
| | Sulfur | 0.6 | 0.6 | 0.6 | 0.6 | 0.6 | 0.6 | 5.0 |
| | Vulcanization accelerator | 1.0 | 1.0 | 1.0 | 1.0 | 1.0 | 1.0 | 1.0 |

TABLE 3

| | | Comparative Example | | | | Example | | | | | | | | |
|---|---|---|---|---|---|---|---|---|---|---|---|---|---|---|
| | | 1 | 2 | 3 | 4 | 1 | 2 | 3 | 4 | 5 | 6 | 7 | 8 | 9 |
| Innerliner | Composition | A1 | A2 | A3 | A1 | A2 | A2 | A3 | A4 | A5 | A6 | A2 | A2 | A2 |
| | Thickness [mm] | 0.5 | 0.5 | 0.5 | 0.5 | 0.5 | 0.5 | 0.5 | 0.5 | 0.5 | 0.5 | 0.5 | 0.5 | 0.5 |
| Insulation | Composition | B1 | B1 | B1 | B2 | B2 | B3 | B3 | B2 | B3 | B3 | B5 | B6 | B7 |
| | Thickness [mm] | 0.5 | 0.5 | 0.5 | 0.5 | 0.5 | 0.5 | 0.5 | 0.5 | 0.5 | 0.5 | 0.5 | 0.5 | 0.5 |
| (Butyl-based rubber content of innerliner) − (Butyl-based rubber content of insulation) | | 70 | 90 | 100 | 20 | 40 | 10 | 20 | 30 | 20 | 20 | 10 | 10 | 10 |
| Evaluation result | Adhesion in joint portion | 100 | 75 | 50 | 115 | 130 | 140 | 150 | 130 | 140 | 170 | 180 | 190 | 195 |
| | Air retention properties | 100 | 120 | 130 | 120 | 140 | 150 | 160 | 130 | 170 | 160 | 180 | 160 | 180 |

The pneumatic tires of the examples included a carcass, an insulation adjacent to the radially inner side of the carcass, and an innerliner adjacent to the radially inner side of the insulation, wherein the innerliner included an innerliner rubber composition containing predetermined amounts of a butyl-based rubber, carbon black, zinc oxide, and sulfur; the insulation included an insulation rubber composition containing predetermined amounts of a butyl-based rubber, an isoprene-based rubber, carbon black, and sulfur; and the butyl-based rubber contents based on 100% by mass of the polymer component of the innerliner and insulation rubber compositions satisfied a predetermined relationship. These pneumatic tires were excellent in air retention properties and adhesion at the interface between the innerliner and the insulation, particularly in the joint portion.

Further, comparison of Example 1 with Comparative Examples 1, 2, and 4 demonstrates that the combined use of the specific innerliner with the specific insulation synergistically improved the adhesion.

REFERENCE SIGNS LIST 2 pneumatic tire
4 tread
10 carcass
12 breaker
14 innerliner
15 band
16 insulation
28 first ply
30 second ply
44 inner layer
46 outer layer

The invention claimed is:

1. A pneumatic tire, comprising:
a carcass; an insulation layer adjacent to a radially inner side of the carcass; and an innerliner adjacent to a radially inner side of the insulation layer,
the innerliner comprising an innerliner rubber composition that comprises a polymer component including, based on 100% by mass thereof, 80 to 100% by mass of a butyl-based rubber and comprising, per 100 parts by mass of the polymer component, 40 to 70 parts by mass of carbon black, 0.5 to 5.0 parts by mass of zinc oxide, and 0.2 to 5.0 parts by mass of sulfur,
the insulation layer comprising an insulation layer rubber composition that comprises a polymer component including, based on 100% by mass thereof, 70 to 90% by mass of a butyl-based rubber and 10 to 30% by mass of an isoprene-based rubber and comprising, per 100 parts by mass of the polymer component, 40 to 80 parts by mass of carbon black and 0.2 to 5.0 parts by mass of sulfur,
wherein the butyl-based rubber comprises one or more of butyl rubber, brominated butyl rubber or chlorinated butyl rubber,
the innerliner and insulation layer rubber compositions having butyl-based rubber contents based on 100% by mass of the polymer component that satisfy the following relationship: (Butyl-based rubber content of innerliner rubber composition)≥(Butyl-based rubber content of insulation layer rubber composition).

2. The pneumatic tire according to claim 1, wherein the butyl-based rubber contents based on 100% by mass of the polymer component of the innerliner and insulation layer rubber compositions satisfy the following relationship:

0≤(Butyl-based rubber content of innerliner rubber composition)−(Butyl-based rubber content of insulation layer rubber composition)≤50.

3. The pneumatic tire according to claim 1, wherein the insulation layer rubber composition comprises 0.2 to 1.5 parts by mass of sulfur per 100 parts by mass of the polymer component.

4. The pneumatic tire according to claim 1, wherein the innerliner rubber composition comprises a polymer component including, based on 100% by mass thereof, 80 to 95% by mass of a butyl-based rubber and 5 to 20% by mass of an isoprene-based rubber.

5. The pneumatic tire according to claim 1, wherein the innerliner has a thickness of 0.1 to 5.0 mm.

6. The pneumatic tire according to claim 1, wherein the insulation layer has a thickness of 0.1 to 5.0 mm.

7. A pneumatic tire, comprising:
a carcass; an insulation layer adjacent to a radially inner side of the carcass; and an innerliner adjacent to a radially inner side of the insulation layer,
the innerliner comprising an innerliner rubber composition that comprises a polymer component including, based on 100% by mass thereof, 80 to 95% by mass of a butyl-based rubber and 5 to 20% by mass of an isoprene-based rubber and comprising, per 100 parts by mass of the polymer component, 40 to 70 parts by mass of carbon black, 0.5 to 5.0 parts by mass of zinc oxide, and 0.2 to 5.0 parts by mass of sulfur,
the insulation layer comprising an insulation layer rubber composition that comprises a polymer component including, based on 100% by mass thereof, 20 to 90% by mass of a butyl-based rubber and 10 to 80% by mass of an isoprene-based rubber and comprising, per 100 parts by mass of the polymer component, 40 to 80 parts by mass of carbon black and 0.2 to 5.0 parts by mass of sulfur,
wherein the butyl-based rubber comprises one or more of butyl rubber, brominated butyl rubber or chlorinated butyl rubber,
the innerliner and insulation layer rubber compositions having butyl-based rubber contents based on 100% by mass of the polymer component that satisfy the following relationship: (Butyl-based rubber content of innerliner rubber composition)≥(Butyl-based rubber content of insulation layer rubber composition).

8. The pneumatic tire according to claim 7, wherein the butyl-based rubber contents based on 100% by mass of the polymer component of the innerliner and insulation layer rubber compositions satisfy the following relationship:

0≤(Butyl-based rubber content of innerliner rubber composition)−(Butyl-based rubber content of insulation layer rubber composition)≤50.

9. The pneumatic tire according to claim 7, wherein the insulation layer rubber composition comprises a polymer component including, based on 100% by mass thereof, 70 to 90% by mass of a butyl-based rubber and 10 to 30% by mass of an isoprene-based rubber.

10. The pneumatic tire according to claim 7, wherein the insulation layer rubber composition comprises 0.2 to 1.5 parts by mass of sulfur per 100 parts by mass of the polymer component.

11. The pneumatic tire according to claim 7, wherein the innerliner has a thickness of 0.1 to 5.0 mm.

12. The pneumatic tire according to claim 7, wherein the insulation has a thickness of 0.1 to 5.0 mm.

* * * * *